S. SZEKELY.
DIRIGIBLE LAMP FOR AUTOMOBILES.
APPLICATION FILED AUG. 18, 1911.
1,008,090.
Patented Nov. 7, 1911.
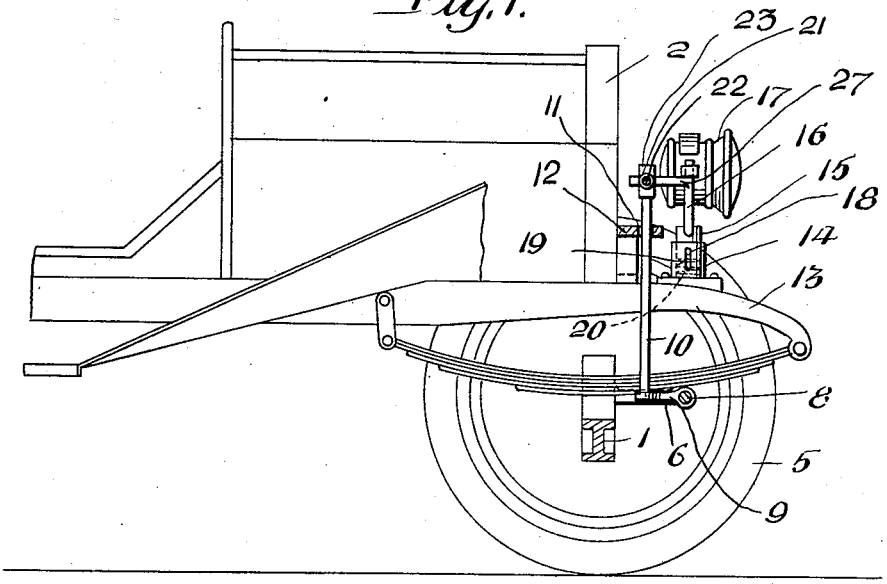
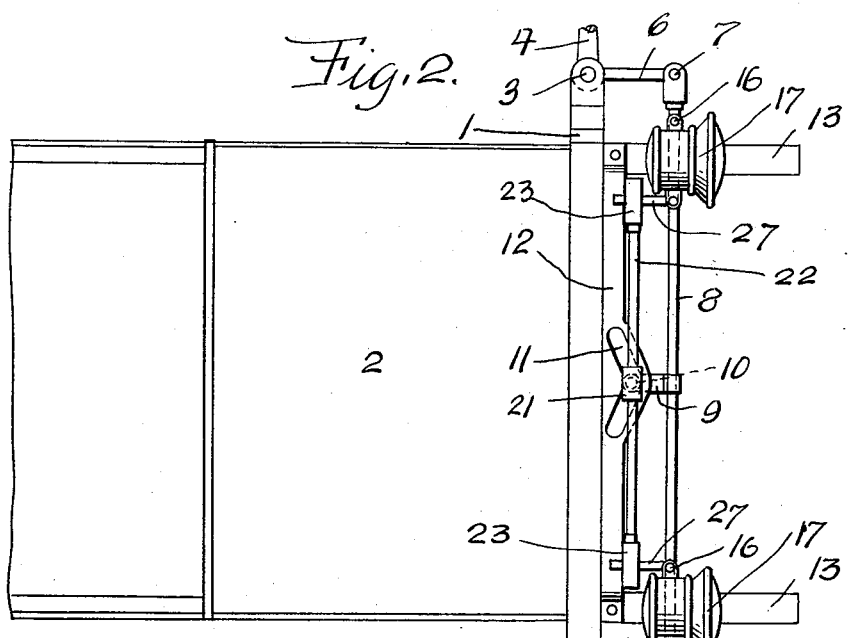
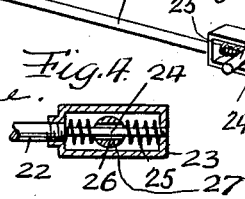

UNITED STATES PATENT OFFICE.

STEVE SZEKELY, OF NEW BRUNSWICK, NEW JERSEY.

DIRIGIBLE LAMP FOR AUTOMOBILES.

1,008,090.  Specification of Letters Patent.  Patented Nov. 7, 1911.

Application filed August 18, 1911. Serial No. 644,747.

*To all whom it may concern:*

Be it known that I, STEVE SZEKELY, a subject of the King of Hungary, residing at New Brunswick, in the county of Middlesex and State of New Jersey, have invented certain new and useful Improvements in Dirigible Lamps for Automobiles, of which the following is a specification, reference being had therein to the accompanying drawing.

This invention relates to dirigible lamps for automobiles, and the objects of my invention are first, to provide a lamp shifting mechanism that is applicable to various types of automobiles; second, to provide positive and reliable means, in a manner as will be hereinafter set forth, for compensating for the vibrations to which the adjusting mechanism is subjected, and third, to provide a lamp adjusting mechanism that is strong and durable and highly efficient for the purposes for which it is intended.

I attain the above objects by a mechanical construction that will be hereinafter specifically described and then claimed, and reference will now be had to the drawing, wherein:—

Figure 1 is a longitudinal sectional view of the adjusting mechanism as applied to a portion of an automobile, Fig. 2 is a plan of the same, Fig. 3 is a perspective view of a portion of one of the lamp holders, and Fig. 4 is a longitudinal sectional view of a yieldable connection for the lamp holder.

The reference numeral 1 denotes the forward axle of an automobile 2, said axle having knuckles 3 and spindles 4 adapted to revolubly support the forward wheels 5 of the automobile. The knuckles 3 are provided with forward extending arms 6 and pivotally connected to said arms by pins 7 is a connecting rod 8. The connecting rod 8, intermediate the ends thereof, has a rearwardly extending support 9 for a vertical pin 10. This pin extends through an angularly disposed slot 11 provided therefor in a guide bar 12, carried by the longitudinal frames 13 of the automobile 2.

Mounted upon the frames 13 are sockets 14 for the base pieces 15 of lamp holders 16. The lamp holders 16 are adapted to support lamps or lanterns 17. The base pieces 15 of the lamp holders have pins 18 extending through slots 19 provided therefor in each socket 14, and arranged in each socket is a coiled spring 20 adapted to cushion the movement of the base pieces 15. In this manner the vibrations of the automobile body are prevented from jarring or breaking the lamps or lanterns.

Connected to the upper end of the pin 10 by a T 21 is an actuating rod 22 and the ends of this rod are provided with housings 23. In each housing is arranged a longitudinal pin 24 encircled by compression springs 25. The pin 24 extends through an opening 26 provided therefor in an arm 27, carried by the inner side of each lamp holder. The inner convolutions of the springs 25 engage the arm 27 and in this manner the vibrations of the actuating rod 22 are prevented from jarring the lamp holders.

The shape of the slot 11 in the guide 12 guides the movement of the actuating rod 22, and as the arms 27 represent cranks, the lamps or lanterns 17 will be shifted in a direction similar to the forward wheels 5. The rays of light emitted by the lamps or lanterns will be projected in the path of the wheels 5.

What I claim is:—

1. The combination with an automobile having a forward axle, knuckles and longitudinal frames, of forwardly extending arms carried by said knuckles, a connecting rod having the ends thereof pivotally connected to said arms, a vertical pin supported by said rod, a guide carried by said frames and having an angularly disposed slot formed therein adapted to guide said pin, an actuating rod carried by said pin, and lamp holders movably supported by said frames and adapted to be moved by the ends of said actuating rod.

2. The combination with an automobile having a forward axle, knuckles and longitudinal frames, of forwardly extending arms carried by said knuckles, a connecting rod having the ends thereof pivotally connected to said arms, a vertical pin supported by said rod, a guide carried by said frames and having an angularly disposed slot formed therein adapted to guide said pin, an actuating rod carried by said pin, lamp holders movably supported by said frames and adapted to be moved by the ends of said actuating rod, means including housings and springs adapted to loosely connect the ends of said actuating rod to said lamp holders, and means including sockets and springs adapted to movably support said lamp holders.

In testimony whereof I affix my signature in the presence of two witnesses.

STEVE SZEKELY.

Witnesses:
  JOSEPH POKORNY,
  JOHN BODAUCK.

Copies of this patent may be obtained for five cents each, by addressing the "Commissioner of Patents, Washington, D. C."